(12) United States Patent
Bacchi et al.

(10) Patent No.: US 11,937,616 B2
(45) Date of Patent: Mar. 26, 2024

(54) AUTOMATED APPARATUS FOR MANUFACTURING FOOD TABLETS FOR HOT BEVERAGE BREWING

(71) Applicant: Caffemotive Srl, Trieste (IT)

(72) Inventors: Andrea Bacchi, Correggio (IT); Massimo Chenda, Muggia (IT)

(73) Assignee: Luigi Lavazza—Società per Azioni, Turin (IT)

(*) Notice: Subject to any disclaimer, the term of this patent is extended or adjusted under 35 U.S.C. 154(b) by 627 days.

(21) Appl. No.: 17/250,255

(22) PCT Filed: Jun. 24, 2019

(86) PCT No.: PCT/IB2019/055308
§ 371 (c)(1),
(2) Date: Dec. 22, 2020

(87) PCT Pub. No.: WO2020/003099
PCT Pub. Date: Jan. 2, 2020

(65) Prior Publication Data
US 2021/0259271 A1 Aug. 26, 2021

(30) Foreign Application Priority Data
Jun. 25, 2018 (IT) .................. 102018000006618

(51) Int. Cl.
*A23F 5/12* (2006.01)
*A23F 5/08* (2006.01)
(Continued)

(52) U.S. Cl.
CPC ............... *A23F 5/125* (2013.01); *A23F 5/08* (2013.01); *H05B 6/80* (2013.01); *A23P 10/28* (2016.08)

(58) Field of Classification Search
CPC .... A23F 5/08; A23F 5/125; A23L 5/15; A23P 10/28; H05B 6/6447; H05B 6/686; H05B 6/702; H05B 6/80; Y02B 40/00
(Continued)

(56) References Cited

U.S. PATENT DOCUMENTS

2010/0159086 A1 6/2010 Diolaiti
2011/0068511 A1 3/2011 Sowden
(Continued)

FOREIGN PATENT DOCUMENTS

CA 2027406 4/1992
EP 2154987 2/2010
(Continued)

*Primary Examiner* — Dana Ross
*Assistant Examiner* — James F Sims, III
(74) *Attorney, Agent, or Firm* — Themis Law

(57) ABSTRACT

An apparatus for manufacturing tablets for hot beverage brewing includes a reservoir feeding infusible loose food products, a grinding system for the loose food products to obtain grounds of a given size, a moistening system moistening the grounds to a given moisture content, a mixing and homogenizing system for mixing and homogenizing the grounds to a homogeneous mixture, a weighing system of the homogeneous mixture to obtain a dose of predetermined weight, a forming system forming the dose into a tablet of predetermined volume, an irradiation system for electromagnetic irradiation of the tablet to overheat the particles to a partial baking and/or sintering for compactness and self-supporting ability without an enclosure, and a control system acting on the grinding, moistening, homogenizing, system, forming, and irradiating systems to control particle size, moisture content, homogeneity, weight, volume and compactness parameters of the tablet and change water permeability of the tablet accordingly.

21 Claims, 5 Drawing Sheets

(51) Int. Cl.
　　　*A23P 10/28*　　(2016.01)
　　　*H05B 6/80*　　(2006.01)
(58) Field of Classification Search
　　　USPC .......................................................... 99/484
　　　See application file for complete search history.

(56) References Cited

U.S. PATENT DOCUMENTS

2012/0164022 A1　　6/2012　Muginstein
2015/0250199 A1*　9/2015　Bacchi .................... A61K 9/20
　　　　　　　　　　　　　　　　　　　　　426/242

FOREIGN PATENT DOCUMENTS

| EP | 2793597 | 10/2014 |
|----|---------|---------|
| GB | 2188740 | 10/1987 |
| JP | S66684721 | 7/1987 |
| JP | 2015168643 | 2/2018 |
| KR | 20070050413 | 5/2007 |

* cited by examiner

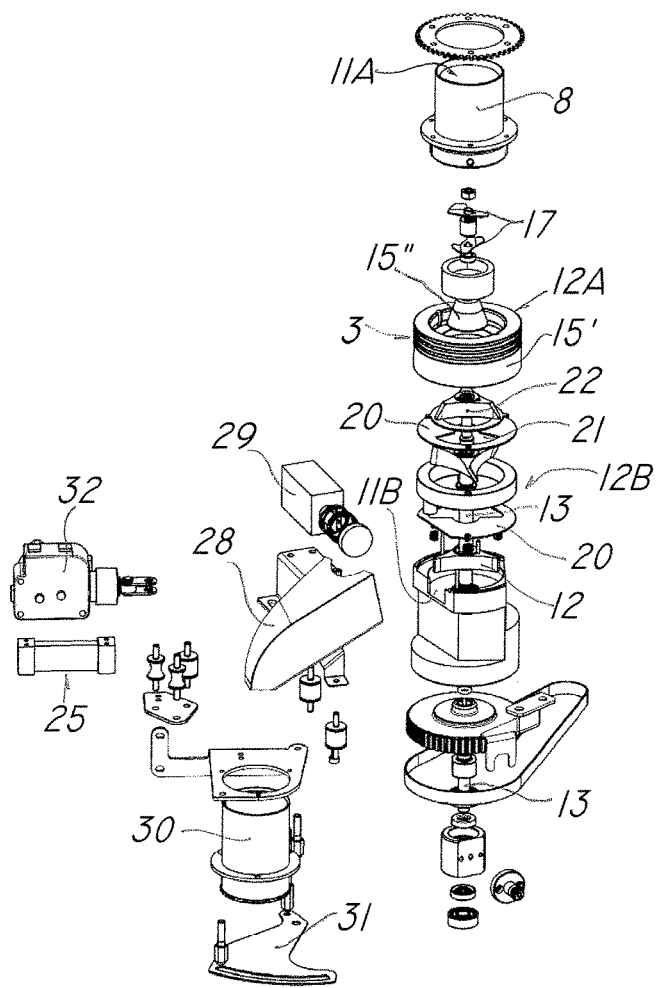
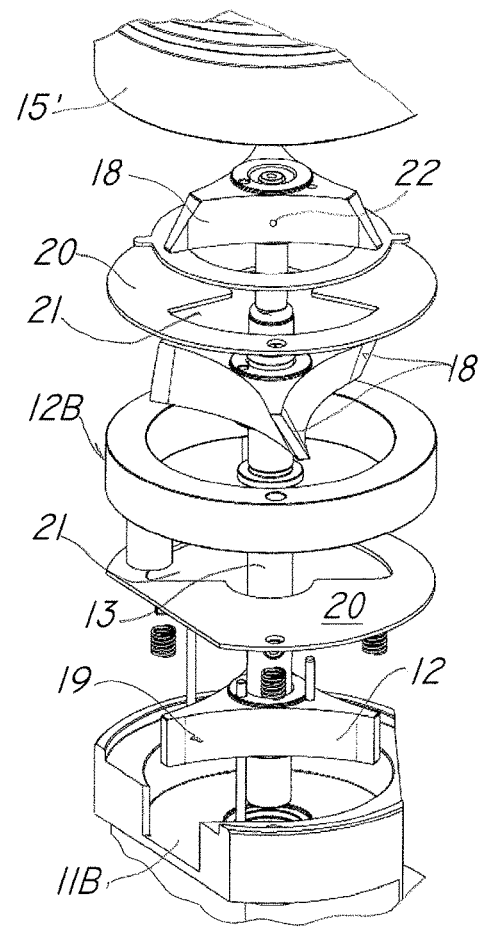
FIG. 5
FIG. 6
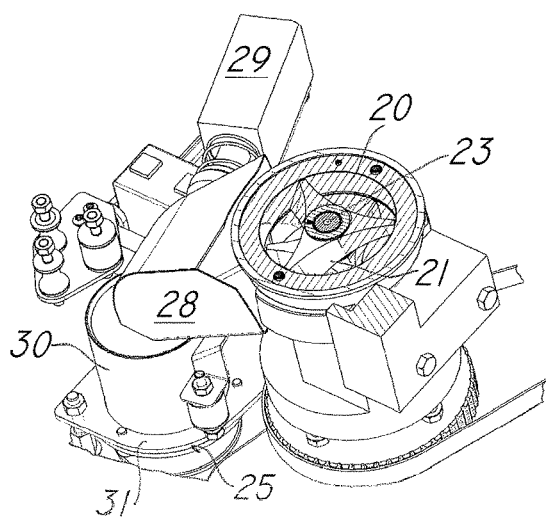
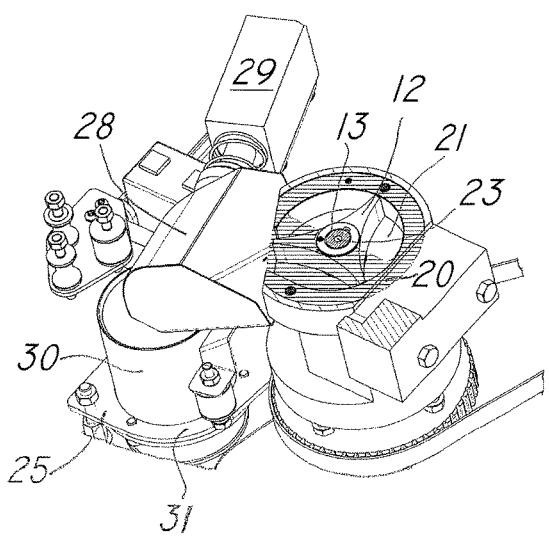
FIG. 7A
FIG. 7B

AUTOMATED APPARATUS FOR MANUFACTURING FOOD TABLETS FOR HOT BEVERAGE BREWING

FIELD OF THE INVENTION

The present invention generally finds application in the field of food preparation and particularly relates to an apparatus for automated production of tablets for hot beverage brewing.

BACKGROUND ART

Certain beverages are known to be prepared by instantaneous infusion or brewing of flavors and ingredients contained in food products such as coffee, barley, malt, ginseng, herbal teas and the like.

Beverage infusion of brewing is generally carried out using warm or hot water at ambient pressure or preferably above atmospheric pressure.

A particular class of base products requires grinding to obtain products of various particle sizes.

A first typical example of such class of products is coffee, which is previously mixed, roasted and then cold-ground to obtain the classical coffee powder that is sold in hermetically and vacuum sealed packages for home and public use.

Another typical example is composed of portions of coffee powder in prepackaged filter paper pods or plastic or aluminum capsules of various shapes and sizes.

The pods are introduced into relatively inexpensive machines, which are affordable to private consumers or small-size businesses and communities, to prepare a top-quality espresso.

One drawback of such prior art methods and items for obtaining espresso and other beverages consists in the relatively high costs for manufacturing and packaging capsules or pods, which results in accordingly high sales costs for the final consumer.

A further drawback is that this known type of packaging requires the presence of enclosures made of plastic, paper, aluminum or other materials to contain the products to be filtered, which make the manufacturing process more complex and problematic.

Yet another drawback relates to environment-friendly disposal and environmental impact reduction issues, due to such enclosures, after coffee dispensing.

In an attempt to obviate the above drawbacks, a novel process has been developed for manufacturing tablets or pastilles, that does not require any kind of enclosure, but requires moistening of the tablet and application of energy thereto, in the form of vibrations, namely high-frequency ultrasonic vibrations.

Processes of this type are disclosed and claimed, for instance, in EP1956921. While this preparation method has provided a number of advantages over prior art products, such as the elimination of the outer plastic capsule for coffee powder, which considerably reduces environmental impact, it still has the drawback that vibrations are required to be transferred by contact or through an interposed medium, which increases the complexity and costs of the manufacturing process.

Furthermore, the tablet is not uniformly compacted, as ultrasonic waves are progressively attenuated as they pass through the tablet, and the tablet cannot be uniformly compacted above a given thickness limit.

An attempt to at least partially obviate this drawback was made by developing a method of production of tablets for hot beverage brewing that uses a step of administering electromagnetic waves to the tablet to impart relative compactness and self-supporting ability without requiring an enclosure, as described and claimed in EP2793597, issued to the Applicant hereof.

While this solution is more flexible and energy-effective as compared with the use of ultrasonic waves for the production of tablets, it still suffers from certain drawbacks.

A first drawback is that electromagnetic waves are administered using a generator of microwave electromagnetic waves having a fixed, non-adjustable frequency.

Considering that the frequency of electromagnetic waves should be varied to produce tablets having different sizes and organoleptic properties with a consistent high quality of the final product, the limitation of a fixed-frequency microwave generator is self-evident, unless a step generator configuration is varied.

A further drawback of this known arrangement is that the step of homogenizing and moistening the coffee powder must be carried out manually and requires highly complex means, which increases the tablet manufacturing times.

Technical Problem

In view of the prior art, the technical problem addressed by the present invention is to provide an apparatus for automatic production of tablets for hot beverage brewing with no enclosure and having a variable degree of compaction, affording high throughput and energy-efficiency.

DISCLOSURE OF THE INVENTION

The object of the present invention is to obviate the above drawback, by providing an apparatus for fully automated production of self-supporting tablets that is highly efficient and relatively cost-effective.

A particular object of the present invention is to provide an apparatus as described hereinbefore that can reduce the tablet production times.

Yet another particular object of the present invention is to provide an apparatus as described above that can afford highly energy-efficiency tablet production.

A further object of the present invention is to provide an apparatus as described hereinabove that can accurately calibrate upon request the amount of aggregation of the grounds and hence the degree of water permeability.

Another object of the present invention is to provide an apparatus as described hereinbefore that can produce self-supporting tablets, with no support and/or added bonding material.

A further object of the present invention is to provide an apparatus as described hereinabove that can produce tablets in which the grounds are only aggregated by its own materials and a small amount of water.

Another object of the present invention is to provide an apparatus as described hereinabove that can adjust the fineness and amount of grounds, the amount of added water, the throughput time and the forming thrust on the grounds.

Yet another object of the present invention is to provide an apparatus as described hereinabove that can con considerably reduce the apparatus management and tablet manufacturing costs.

These and other objects, as more clearly explained hereinafter, are fulfilled by an apparatus for manufacturing food tablets for hot beverage brewing as defined in claim 1, which apparatus comprises a reservoir for feeding infusible loose food products, means for grinding loose food products to obtain grounds with a predetermined particle size, means for moistening the grounds to a predetermined moisture content and means for mixing and homogenizing wetted grounds to obtain a homogeneous mixture.

The apparatus further comprises means for weighing the wetted and homogenized mixture to obtain a dose having a predetermined weight, means for forming the dose of mixture into a tablet having a predetermined volume and means for irradiating the tablet with a beam of electromagnetic waves to overheat the particles of the wetted mixture to partial baking and/or sintering, to impart relative compactness and self-supporting ability thereto without requiring an enclosure.

The apparatus comprises control means which act on the grinding, moistening means, homogenizing, weighing, forming and irradiating means to control the particle size, moisture content, homogeneity, weight, volume and compactness parameters of the tablet to thereby change the water permeability of the final tablet according to these parameters.

This combination of features affords quick and highly energy-efficient production of self-supporting tablets.

Furthermore, the amount of added water is homogenized with the dose of grounds and is then dispersed in the environment by evaporation after completion of the process.

Also, based on these features the apparatus of the invention can calibrate the amount of aggregation of the powder, and adjust the various operation parameters using a computer or PLC controlled by a dedicated software, and different water permeabilities may be imparted to the tablet as required. Such differential permeability allows optimized use of the coffee or other ground product, which is known to have different behaviors according to the type of product, and the way it is treated, ground, roasted, pressed.

Advantageous embodiments of the invention are obtained in accordance with the dependent claims.

BRIEF DESCRIPTION OF THE DRAWINGS

Further characteristics and advantages of the invention will be more apparent upon reading of the detailed description of a preferred, non-exclusive embodiment of an apparatus for automated production of self-supporting tablets for hot beverage brewing, as shown by way of a non-limiting example with the help of the following drawings, in which:

FIGS. 5 and 6 are an exploded perspective view and a respective enlarged view of the first detail of the apparatus of FIG. 3;

FIGS. 7A and 7B are two broken-away views of the first detail of the apparatus of FIG. 3;

DETAILED DESCRIPTION OF A PREFERRED EXEMPLARY EMBODIMENT

Figure 1:
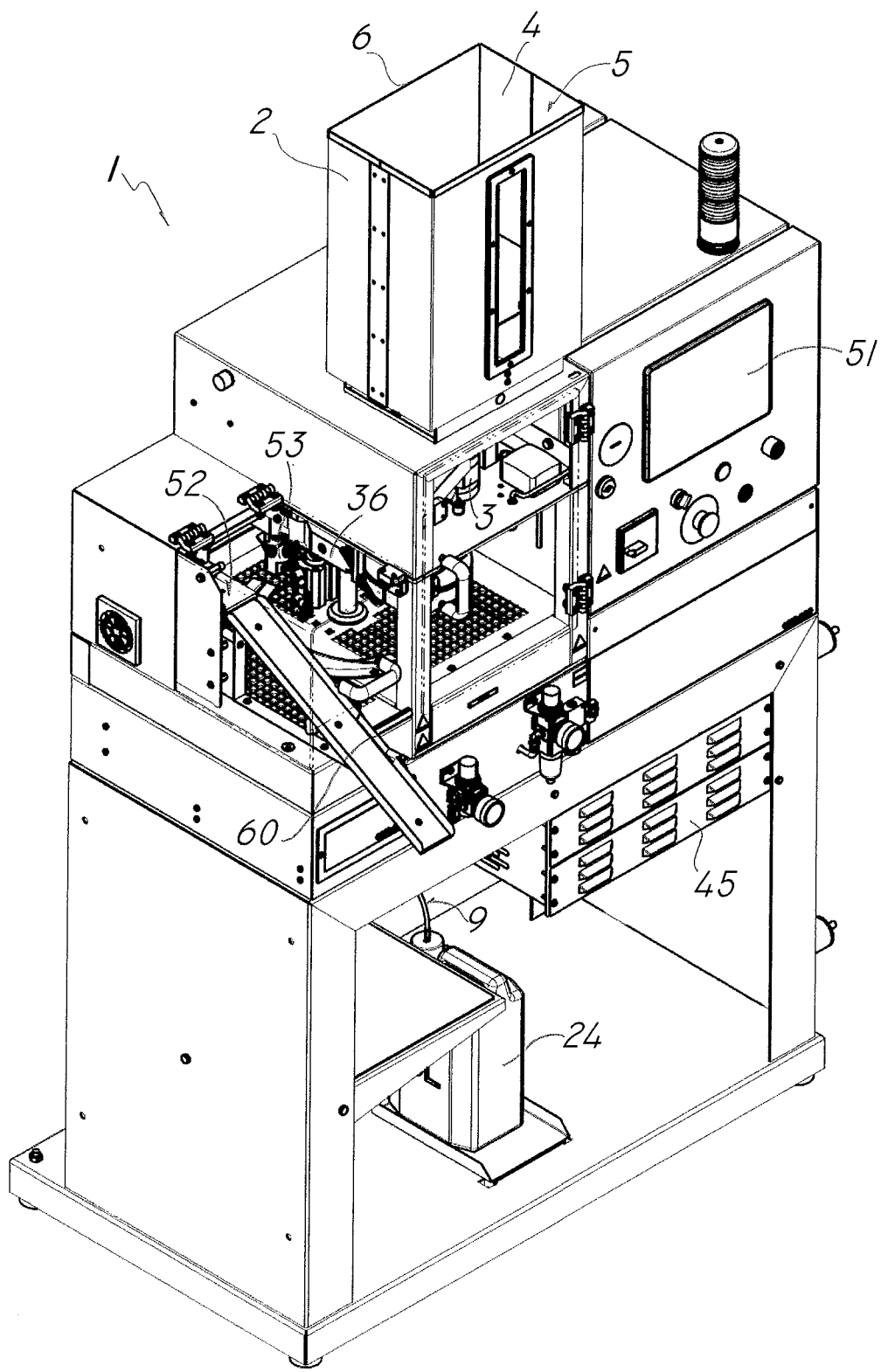
FIG. 1 is a perspective view of the apparatus of the invention.
Figure 2:
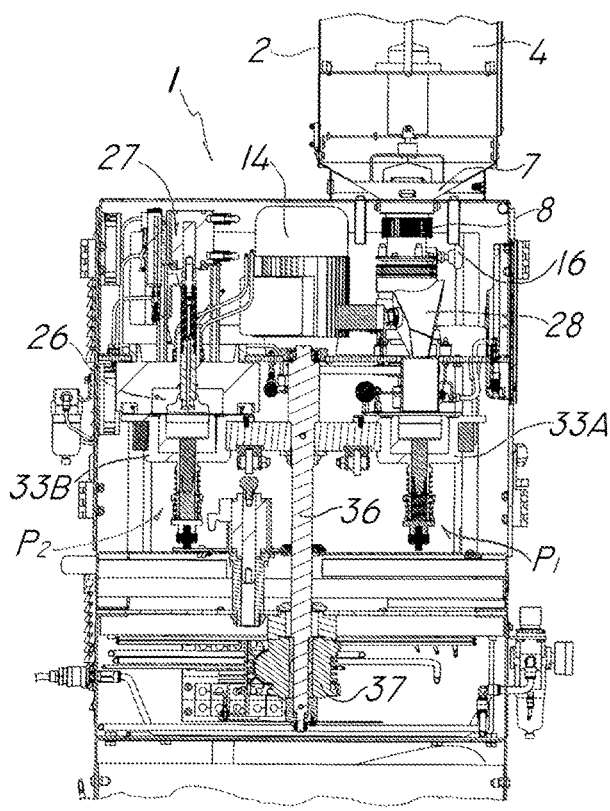
FIG. 2 is a broken-away view of the apparatus of FIG. 1.

Particularly referring to the aforementioned figures, there is shown an apparatus, generally designated by numeral 1, for automated production of food tablets for hot beverage brewing.

The apparatus 1 may be advantageously used with a variety of products, as long as they are infusible, including, without limitation, coffee, barley, malt, ginseng, tea, Hibiscus tea, herbal teas and other similar products.

While the apparatus is described below with reference to a coffee tablet, the apparatus can be also used with any of the aforementioned products.

As shown in FIGS. 1 to 4, the apparatus 1 comprises a coffee bean reservoir 2 above loose product grinding means 3, to obtain a ground product with a predetermined particle size.

The upper reservoir 2 may comprise a container 4 of any shape, whose predetermined capacity is sufficient to feed the apparatus 1 for manufacturing a serving and has an upper loading mouth 5, preferably with a door 6, for receiving and protecting the loose product, and a lower feeding mouth 7 operably coupled to the grinding means 3.

Advantageously, the reservoir 2 may be equipped with a level sensor, not shown, for detecting the amount of continuously loaded product. The loose product can flow by gravity toward the grinding means 3 through a tubular connecting channel 8 located in the lower mouth 7 of the reservoir 2.

Grounds moistening means 9 are provided downstream from the grinding means 3 for moistening the grounds to a predetermined moisture content and mixing and homogenizing means 10 for mixing and homogenizing the wetted grounds to obtain a homogeneous mixture.

Figure 3:
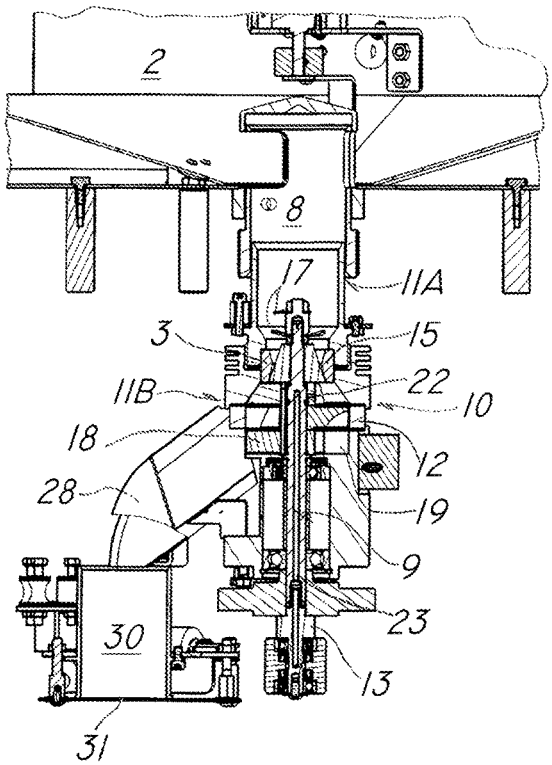
FIG. 3 is a broken-away view of a first detail of the apparatus of FIG. 1.
Figure 4A:
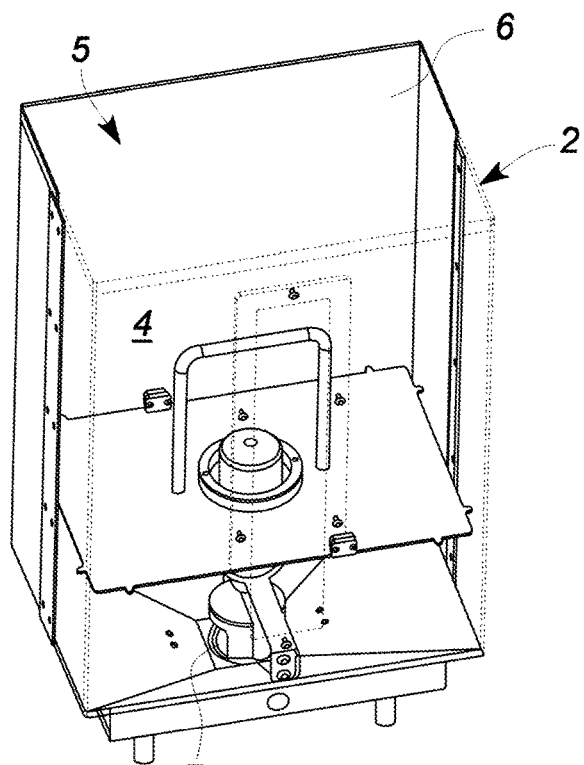
FIGS. 4A and 4B are perspective and broken-away views respectively of a second detail of the apparatus of FIG. 1.
Figure 4B:
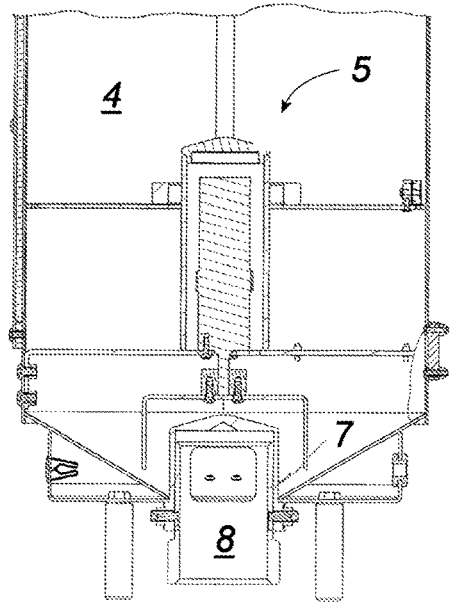

In the illustrated embodiment, the grinding means 3, the moistening means 9 and the homogenizing means 10 are combined in a first operating unit 11 having an inlet opening 11A for the food product and a discharge opening 11B for the wetted and homogenized mixture, as best shown in FIG. 3.

The grinding means 3 and the mixing and homogenizing means 10 may comprise a series of rotating disk elements 12A, 12b mounted one on top of the other to a vertical drive shaft 13 driven by a first electric motor 14 having a variable and suitably controlled rotation speed.

The disk elements 12A, 12B are suitably shaped to carry out the respective steps of grinding, mixing and homogenizing and to allow the passage and flow of the product being treated from the inlet opening 11A to the discharge opening 11B.

As best shown in FIGS. 3 and 5, the disc-shaped grinding elements 12A comprise a pair of grinding wheels 15 having a substantially conical profile, an outer stationary grinding wheel 15' and an inner rotating grinding wheel 15'', which is keyed to the drive shaft 13 and is substantially concentric with the stationary grinding wheel 15' with a predetermined axial distance therebetween.

Suitably, this distance between the grinding wheels 15 can be suitably adjusted by means of a first actuator 16 to change the particle size of the grounds according to the type of tablet to be obtain.

Preferably, guiding vanes 17 having a partially helical or simply inclined profile are arranged above the conical grinding wheels 15, for consistently stirring and compressing the loose product toward the grinding wheels 15.

As best shown in FIGS. 5 to 8, the mixing and homogenizing disk elements 12B may be substantially similar and comprise blades 18 separated by a lobed space 19 having a predetermined section.

Conveniently, the bladed mixing and homogenizing disk elements 12B may be separated by stationary horizontal separator rings 20 having at least one slit 21 of predetermined width for the passage of the grounds from a bladed element 12B to another.

Figure 8:
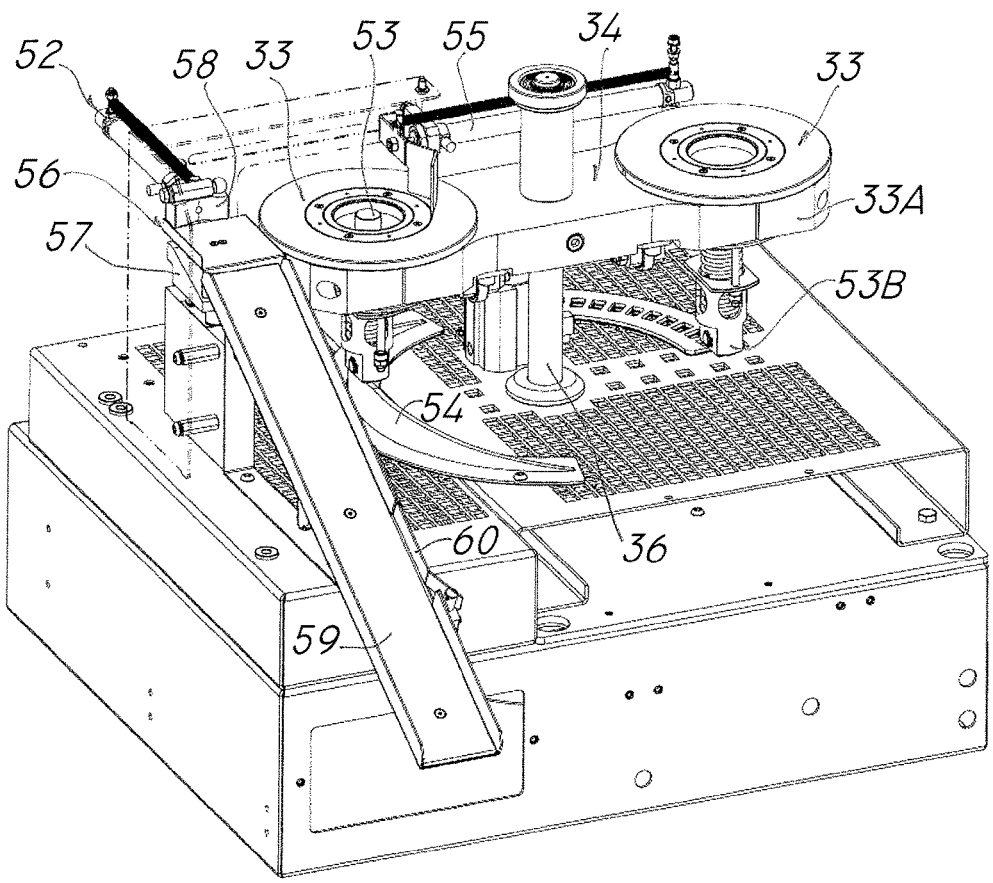
FIGS. 8 and 9 are perspective and broken-away views respectively of a third detail of the apparatus of FIG. 1.

According to a preferred embodiment of the invention, the blades 18 of a bladed disk element 12B may be offset from the blades 18 of the bladed disk element 12*b* next to it and the slit 21 of a separator 20 may be offset from the slit 21 of the separator ring 12*b* next to it, as best shown in FIGS. 7 and 8.

Furthermore, the first operating unit 11 may comprise three mixing and homogenizing disk elements 12B each having three radial blades 18 with mutually symmetric profiles and each bladed disk element 12B may comprise a profile other from that of the other bladed elements 12B.

It was experimentally found that this particular arrangement allows the first operating unit 11 to uniformly mix and homogenize the grounds.

The moistening means 9 may comprise at least one nozzle 22 interposed between the grinding disk elements 12A and a first mixing and homogenizing disk element 12B.

This nozzle 22 may be connected in fluid communication to an axial conduit 23 formed inside the drive shaft 13 and may be conveniently shaped to spray the water contained in a special vessel 24.

The water to be sprayed may be withdrawn from the vessel 24 by means of a variable-flow peristaltic pump, not shown, which allows adjustment of the amount of withdrawn water and hence the moisture content in the grounds in the first operating unit 11.

Preferably, the nozzle 22 may face one of the lobed spaces 19 between the blades 18 of the first bladed disk element 12B, for the grounds to be instantly wetted and at the same time pushed toward the bladed disk elements 12B below to be subsequently homogenized.

As shown in FIGS. 3 and 5 and FIGS. 7 to 11, the apparatus 1 comprises weighing means 25 for weighing the wetted and homogenized mixture to obtain a dose having a predetermined weight, which are followed by forming means for forming 26 the dose of mixture into a tablet having a predetermined volume.

Irradiating means 27 are provided downstream from the forming means 26 for irradiating the tablet with a beam of electromagnetic waves to overheat the particles of the wetted and homogenized mixture to partial baking and/or sintering and impart relative compactness and self-supporting ability thereto without requiring an enclosure.

In order to convey the wetted and homogenized mixture toward the weighing means 25, the disk element 12 located downstream from the nozzle 22 may be placed proximate to the discharge opening 11B of the first operating unit 11 and may face a closed chute 28, which is substantially inclined with a predetermined angle of inclination.

Advantageously, vibrating means 29 may be associated with the chute 28 to facilitate feeding of the wetted and homogenized mixture toward the weighing means 25 and prevent the mixture from locally adhering to the inner surfaces of the chute 28.

The weighing means 25 may comprise a container 30 located at the base of the chute 28 for collecting the mixture, having a lifting bottom wall 31 with a first pressure sensor 32 adapted to enable and disable the drive shaft 13 and stop grinding and feeding of the product as the weight of the dose of collected mixture is reached.

The lifting bottom wall 31 may be alternately driven by an appropriate actuator, not shown, to open the bottom of the container 30 and allow periodic dropping of the dose toward the forming means 26.

The latter may comprise at least one pocket 33 adapted to be placed below the weighing means 25 for temporarily collecting the weighed dose.

Figure 9:
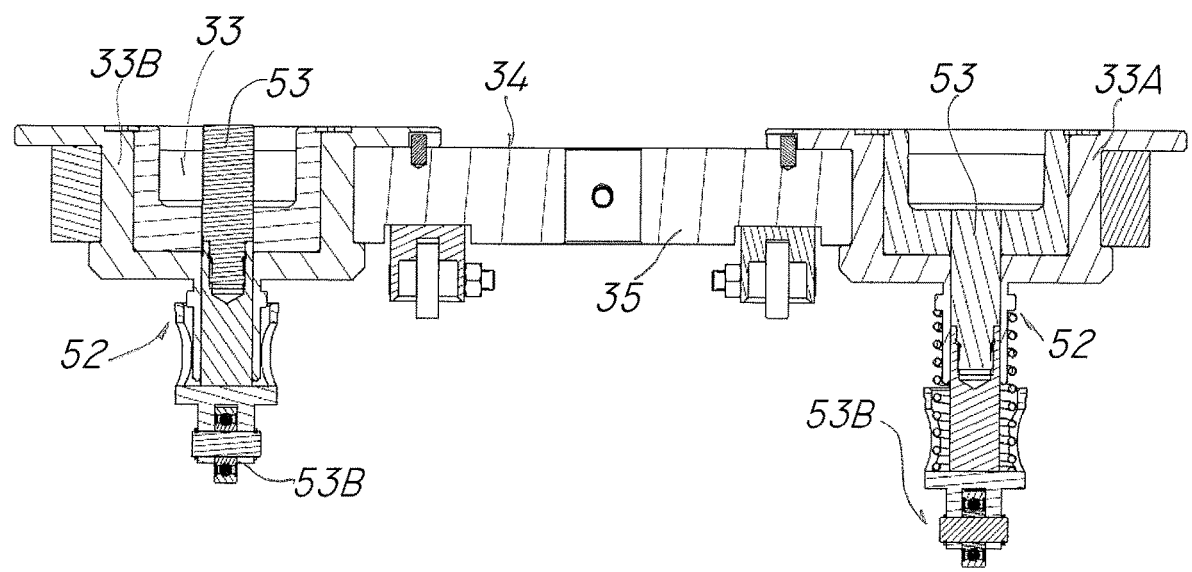

As better shown in FIGS. 8 and 9, each pocket 33 may be mounted to a moving support 34 which is adapted to move the weighed dose from an initial position $P_1$ aligned with the lifting wall 31 to a final position $P_2$ aligned with a tablet irradiating portion.

According to a preferred embodiment of the invention, the moving support 34 may comprise a plurality of pockets 33 and may have a rotational and translational motion to move each of the pockets 33 from the initial position $P_1$ to the final position $P_2$.

Preferably, the moving support 34 may comprise two pockets 33*a*, 33B at the ends 35A, 35B of a horizontal arm 35 which is pivoted on a rotating shaft 36 keyed to a second electric motor 37.

Thus, the horizontal arm 35 can rotate and allow each pocket 33A, 33B to move from the initial aligned position $P_1$ to the final aligned position $P_2$.

Figure 11:
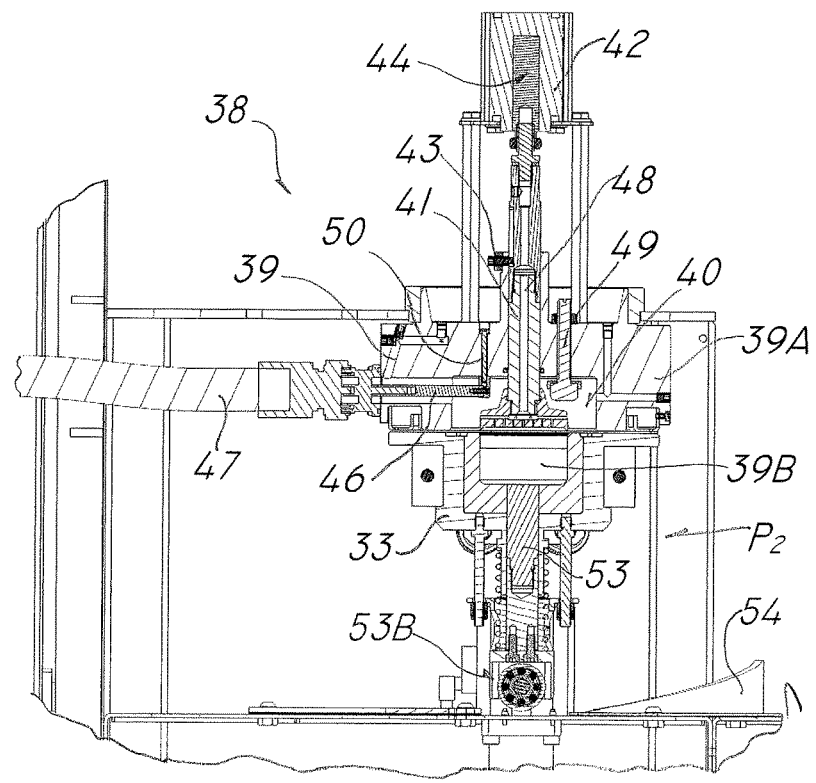

According to a further particular aspect of the invention, the forming means 26 and the irradiating means 27 are combined in a second operating group 38 which comprises an applicator 39 with a stationary upper portion 39A defining an inner irradiation cavity or chamber 40 and a movable lower portion 39*b* defined by the pocket 33, as shown in FIG. 11.

The forming means 26 may comprise a presser 41 which is placed above the pocket 33 when the latter is aligned with the final position $P_2$, and will be alternately operated to vertically move toward the pocket 33 to compress the dose of wetted and homogenized mixture collected by the weighing means 25.

Advantageously, the presser 41 will be moved by pneumatic means 42, or hydraulic or technically equivalent means and will be associated with a second pressure sensor 43 for detecting the degree of compression of the dose that is designed to form the tablet and with a linear sensor 44 adapted to check the thickness of the latter.

Preferably, the pressure exerted by the presser 41 on the dose will be constant throughout the step of irradiation of the electromagnetic waves and may range from 1 to 5 bar, and be preferably about 2.5 bar.

As shown in FIG. 11, the irradiating means 27 may comprise an electromagnetic wave generator 45 connected to an antenna 46 located in the irradiation cavity or chamber 40 of the applicator 39 by means of an appropriately shielded coaxial cable 47.

Preferably, the antenna 46 may be placed in the stationary upper portion 39*a* of the applicator 39.

The generator 45 may be adapted to generate an AC electromagnetic field with an emission frequency oscillating in the microwave range, from 0.5 to 3 GHz, preferably from 2.40 to 2.50 GHz, more preferably of about 2.45 GHz.

As is known per se, the oscillating electromagnetic field generator 45 may be selected from the group comprising power triodes, inverter-controlled power triodes, magnetron amplifiers, solid-state amplifiers or a combination thereof. Preferably, in the embodiment of the drawings, the generator is solid-state generator.

Conveniently, the irradiating means 27 may be operated at the end of the compression step and the presser 41 may have at least one vent relief 48 to allow the steam generated from the water in the tablet during the irradiation step to be discharged to the outside environment.

As is known per se, the presser 41 may be made of a microwave-transparent material, whereas the applicator 39 may be conveniently shaped both to prevent outward leakage of electromagnetic waves and to allow uniform distribution thereof throughout the volume of the dose of grounds.

According to another particular aspect of the invention, the applicator 39 may be equipped with a regulator element 49 which is adapted to vary and calibrate the resonance frequency of the irradiation cavity or chamber 40 to adapt it to an emission frequency of the generator 45.

This is because, when the resonance frequency of the cavity 40 is close to the emission frequency of the generator 45, and hence of the antenna 46, the apparatus 1 is known to be more efficient and to consume less energy for undesired heat dissipation. Thus, the generated electromagnetic field is entirely channeled to the dose of grounds while minimizing the reflected field that might be detrimental to the means of the apparatus 1 that are situated outside the cavity 39.

Nevertheless, during application of the microwave electromagnetic field the amount of water in the dose of grounds is progressively turned into steam and flows out of the cavity 40 of the applicator 39, thereby increasing the field reflected therein.

In order to prevent this, the irradiating means 27 may comprise an electromagnetic sensor 50 adapted to detect the frequency of the electromagnetic field reflected in the cavity 40 and to generate a feedback signal to allow variation of an emission frequency of the electromagnetic field of the generator 45.

It will be appreciated that the irradiating means 27 with the electromagnetic sensor 50 afford self-adjustment of the frequency according to the variation of the moisture content in the dose to be treated and in particular, the resonance frequency will have a higher value at the beginning of the irradiation step and a lower value at the end.

It was experimentally found that a tablet with an acceptable degree of compaction and self-supporting ability can be obtained from a dose of grounds wetted with a moisture content ranging from 5% to 10% based on its mass, with the resonance frequency of the applicator 39 changing from 2.42 GHz, in the beginning with the dose of grounds still wet, to 2.48 GHz immediately prior to the provision of a final sintered tablet.

According to a peculiar aspect of the invention, control means 51 are provided, which act on the grinding means 3, the moistening means 9, the mixing and homogenizing means 10, the weighing means 25, the forming means 26 and the irradiating means 27 to control the particle size, moisture content, homogeneity, weight, volume and compactness parameters of the tablet to thereby change the water permeability of the final tablet according to these parameters.

For example, the control means 51 may be adapted to receive the feedback signal generated by electromagnetic sensor 50 to control the emission frequency of the generator 45 and the irradiation time of the antenna 46 according to the residual moisture content in the tablet to improve efficiency of the irradiating means 27.

In addition, the control means 51 may comprise a computer or, in general, a microprocessor unit operably connected to the first actuator 16 for adjustment of the grinding means 3, to the peristaltic pump of the moistening means 9, to the first electric motor 14 of the grinding means 3 and to the mixing and homogenizing means 10, to the first pressure sensor 32 of the weighing means 25, to the second pressure sensor 43 and to the linear sensor 44 of the forming means 26 and to the electromagnetic sensor 50 of the irradiating means 27.

The microprocessor unit may comprise a memory unit which stores operating software for controlling the operation of the grinding means 3, the moistening means 9, the mixing and homogenizing means 10, the tablet dosing and forming means 26 and for automatically varying the emission frequency of the generator 45.

Figure 10:
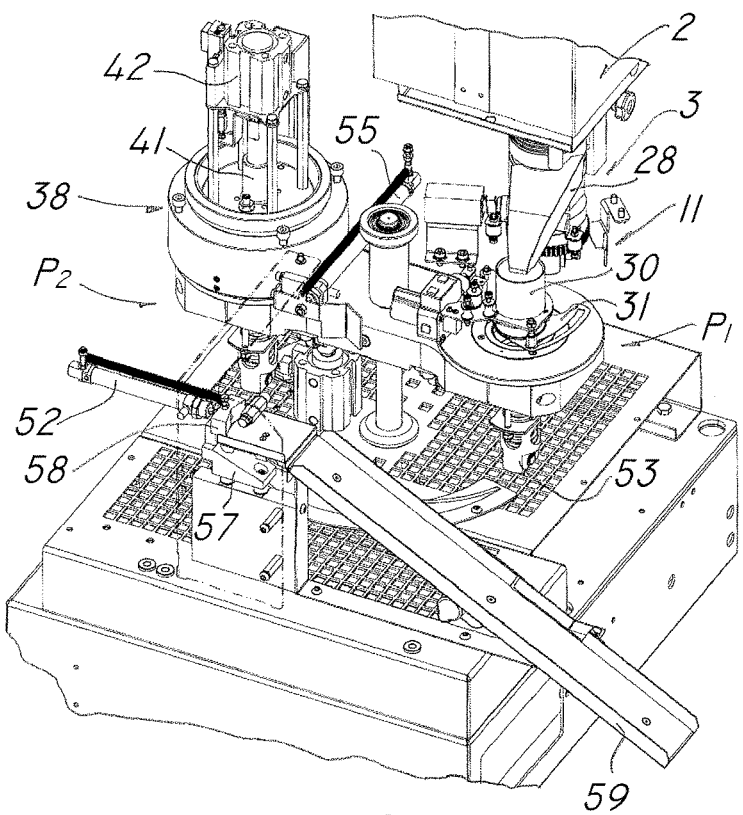
FIGS. 10 and 11 are perspective and broken-away views respectively of a fourth detail of the apparatus of FIG. 1.

As best shown in FIGS. 8 and 10, the apparatus 1 may comprise tablet collecting and conveying means 52 downstream from the irradiating means 27, for carrying the tablets to a packaging station which is adapted to package a plurality of loose tablets in a predetermined package, not shown.

The collecting and conveying means 52 may comprise an ejector 53 placed at the bottom of the pocket 33 and adapted to eject the finished tablet upwards at the end of the forming and irradiation step, as shown in FIG. 9.

The ejector 53 may be selectively actuated during the movement of the horizontal arm 35 with the pocket 33 mounted thereon, and may comprise a lower end 53b adapted to interact with a specially shaped cam 54 to translationally move the ejector 53 upwards, and eject the tablet from the pocket 33.

In addition, the collecting and conveying means 52 may comprise a second actuator 55 of pneumatic type, which is adapted to move the finished tablet from the ejector 53 in the lifted position to a check region 56 having a conventional third pressure sensor 57 thereon, for checking the weight of the finished tablet before the latter is conveyed to the packaging station.

As shown in FIGS. 8 and 10, the checking area 56 may comprise a specially shaped moving blade 58 which is designed to push the finished tablet beyond the checking region 56 once its weight has been checked.

In addition, the collecting and conveying means 52 may comprise a ramp 59 which is adapted to allow the finished tablet pushed by the movable blade 58 to slide toward the packaging station.

Advantageously, the checking region 56 may be suitably connected to a deflecting door 60 located along the ramp 59 to deflect the sliding movement of a finished tablet that does not comply with the desired weight toward a waste area, not shown.

The apparatus 1, may also comprise a plurality of grinding means 3, moistening means 9, weighing means 25, forming means 26 and irradiating means 27 and a plurality of moving supports 34 with a plurality of pockets 33 for in-line production of self-supporting tablets with no enclosure, without departure from the scope of protection of the invention.

It will be appreciated from the foregoing that the apparatus fulfills the intended objects and particularly can reduce the manufacturing time for the tablet, while ensuring high energy efficiency.

While the apparatus has been described with particular reference to the accompanying figures, the numerals referred to in the disclosure and claims are only used for the sake of a better intelligibility of the invention and shall not be intended to limit the claimed scope in any manner.

INDUSTRIAL APPLICABILITY

The present invention may find application in industry, because it can be produced on an industrial scale in the field of food processing.

The invention claimed is:

1. An apparatus for manufacturing food tablets for hot beverage brewing, said apparatus comprising:

a reservoir for feeding a loose infusible food product;

a grinding apparatus for grinding the loose infusible food product to obtain grounds with a predetermined particle size;

a moistening apparatus for wetting the grounds to impart a predetermined moisture content thereto;

a mixing and homogenizing apparatus for mixing and homogenizing the wetted grounds to obtain a homogeneous mixture;

a weighing apparatus for weighing the wetted and homogenized mixture to obtain a dose having a predetermined weight;

a forming apparatus for forming the dose into a tablet having a predetermined volume;

an irradiating apparatus for irradiating the tablet with a beam of electromagnetic waves to overheat particles of the wetted and homogenized mixture to partial baking and/or sintering and impart relative compactness and self-supporting ability thereto without requiring an enclosure; and a control apparatus, configured for controlling operation of the grinding apparatus, the moistening apparatus, the mixing and homogenizing apparatus, the weighing apparatus, the forming apparatus, and the irradiating apparatus, in order to control particle size, moisture content, homogeneity, weight, volume and compactness parameters of the tablet, to thereby change water permeability of the tablet according to said parameters.

2. The apparatus as claimed in claim 1, wherein said grinding apparatus, said moistening apparatus and said mixing and homogenizing apparatus are assembled in a first operating unit having an inlet opening for the loose infusible food product and a discharge opening for the wetted and homogenized mixture.

3. The apparatus as claimed in claim 2, wherein said grinding apparatus and said mixing and homogenizing apparatus comprise a plurality of rotating disk elements, mounted one on top of the other to a drive shaft, said rotating disk elements being configured to carry out respective grinding, mixing and homogenizing steps and push the loose infusible food product from said inlet opening to said discharge opening.

4. The apparatus as claimed in claim 3, wherein said plurality of rotating disk elements comprise grinding disk elements, which comprise a pair of mutually facing grinding wheels which are mounted below a plurality of guiding blades.

5. The apparatus as claimed in claim 4, said plurality of rotating disk elements comprise mixing and homogenizing disk elements, which comprise blades separated by a lobed space having a predetermined section, said mixing and homogenizing disk elements being separated from each other by stationary separator rings having at least one slit for passage of the grounds from one blade to another.

6. The apparatus as claimed in claim 5, wherein said moistening apparatus comprises at least one nozzle interposed between said grinding disk elements and a first mixing and homogenizing disk element, said nozzle being connected in fluid communication to an axial conduit formed inside said drive shaft.

7. The apparatus as claimed in claim 3, wherein said plurality of rotating disk elements comprise a disk element, which is located downstream from said first operating unit and adjacent to said discharge opening and faces an inclined chute to convey the wetted and homogenized mixture toward said weighing apparatus.

8. The apparatus as claimed in claim 7, further comprising a vibrating apparatus associated with said inclined chute to facilitate feeding the wetted and homogenized mixture toward said weighing apparatus and prevent the wetted and homogenized mixture from locally adhering to inner surfaces of said inclined chute.

9. The apparatus as claimed in claim 7, wherein said weighing apparatus comprises a container located at a base of said chute for collecting the wetted and homogenized mixture and having a lifting bottom wall with a first pressure sensor operably connected to said control apparatus to enable and disable said drive shaft and stop grinding and feeding of the food product as a predetermined weight of the dose is reached, said bottom wall being adapted to be alternately moved to allow the dose to drop toward said forming apparatus.

10. The apparatus as claimed in claim 9, wherein said forming apparatus comprises at least one pocket arranged below said weighing apparatus to collect the weighed dose, said at least one pocket being mounted to a moving support, which is adapted to move the weighed dose from an initial position aligned with said lifting bottom wall to a final position aligned with an irradiation portion.

11. The apparatus as claimed in claim 10, wherein the at least one pocket comprises a plurality of pockets associated with said moving support (34), said moving support being adapted to have a rotational and a translational motion to move each of said plurality of pockets from said initial position to said final position.

12. The apparatus as claimed in claim 10, wherein said forming apparatus comprises a presser placed above said at least one pocket in said final position, said presser being alternately operated to compress the dose and being associated with a second pressure sensor to detect a degree of compression of the dose to form the tablet, said presser having at least one vent relief to allow steam, generated during irradiation, to be discharged to an outside environment.

13. The apparatus as claimed in claim 12, wherein said irradiation apparatus comprises an electromagnetic wave generator connected to an antenna within an applicator via a coaxial cable, said electromagnetic wave generator being adapted to generate an AC electromagnetic field with an oscillation frequency in microwave range, from 0.5 to 3 GHz.

14. The apparatus as claimed in claim 13, said electromagnetic wave generator is selected from a group consisting of power triodes, inverter-controlled power triodes, magnetron amplifiers, solid-state amplifiers, or a combination thereof.

15. The apparatus as claimed in claim 13, wherein said applicator comprises a stationary upper portion defining an inner irradiation cavity or chamber and a movable lower portion, which is defined by said at least one pocket, said antenna being located in said inner irradiation chamber or cavity.

16. The apparatus as claimed in claim 15, wherein said applicator is equipped with a regulator, which is adapted to vary and calibrate a resonance frequency of said inner irradiation chamber or cavity to adapt said resonance frequency to an emission frequency of said generator.

17. The apparatus as claimed in claim 16, wherein said irradiation apparatus comprises an electromagnetic sensor, which is adapted to detect a frequency of an electromagnetic field reflected in said inner irradiation chamber or cavity and to generate a feedback signal for said control apparatus, said control apparatus being adapted to vary the emission frequency of said generator and an irradiation time of said antenna according to a residual moisture content of the tablet to improve efficiency of said irradiation apparatus.

18. The apparatus as claimed in claim 17, wherein said control apparatus comprises a microprocessor unit operably connected to said first pressure sensor and said second pressure sensor and to said electromagnetic sensor, and having a memory unit which stores operating software for controlling operation of said grinding apparatus, said moistening apparatus, said mixing and homogenizing apparatus, and said forming apparatus, and for automatically varying the emission frequency of said generator.

19. The apparatus as claimed 10, further comprising a tablet collecting and conveying system downstream from said irradiating apparatus, for carrying the tablets to a packaging station, which is adapted to package a plurality of loose tablets in a predetermined package.

20. The apparatus as claimed in claim 19, wherein said forming apparatus comprises an ejector, located below said at least one pocket and adapted to eject a finished tablet upwards, said collecting and conveying system comprising a second actuator, which is adapted to move the finished tablet from said ejector toward a tablet checking region before carrying the finished tablet to said packaging station.

21. The apparatus as claimed in claim 11, wherein the apparatus comprises a plurality of the grinding apparatus, moistening apparatus, weighing apparatus, forming apparatus, and irradiating apparatus, and a plurality of moving supports with the plurality of pockets.

* * * * *